(12) United States Patent
Lanvin et al.

(10) Patent No.: US 7,444,746 B2
(45) Date of Patent: Nov. 4, 2008

(54) METHOD OF DESIGNING AND MANUFACTURING A PIPE FITTING, PARTICULARLY FOR AIRCRAFT

(75) Inventors: Herve Lanvin, Bonnay (FR); Robert Rossato, Sainte Foy d'Aigrefeuille (FR)

(73) Assignee: Airbus France, Toulouse (FR)

( * ) Notice: Subject to any disclaimer, the term of this patent is extended or adjusted under 35 U.S.C. 154(b) by 503 days.

(21) Appl. No.: 10/940,962

(22) Filed: Sep. 15, 2004

(65) Prior Publication Data
US 2005/0072001 A1  Apr. 7, 2005

(30) Foreign Application Priority Data
Oct. 1, 2003  (FR) .................................. 03 50632

(51) Int. Cl.
*B21D 51/16* (2006.01)
(52) U.S. Cl. .............................. 29/890.144; 29/890.141
(58) Field of Classification Search ............ 29/890.144, 29/890.141, 557; 700/182, 98, 117, 118, 700/161; 72/254
See application file for complete search history.

(56) References Cited

U.S. PATENT DOCUMENTS

| 5,117,866 A | 6/1992 | Nicholas |
| 6,112,133 A | 8/2000 | Fishman |
| 6,581,430 B2 * | 6/2003 | Wilson ......................... 72/254 |
| 2002/0114537 A1 * | 8/2002 | Sutula, Jr. ................... 382/285 |

OTHER PUBLICATIONS

"Tube Fittings Products Quick Reference Guide", Parker Hannifin Corporation-Fluid, XP-002274279, May 1997, 3 pages.
Kief B. Hans, "Rechnerunterstütztes Konstruieren und Fertigen: CAD+CAM", NC/CNC Handbuch, XP-002274280, 2001, pp. 381-398.
J. Liang, et al., "Synthesis of Consolidated Data Schema for Engineering Analysis from Multiple STEP Application Protocols", Computer-Aided Design, vol. 31, No. 7, XP-004172466, Jun. 1999, pp. 429-447.
Mark Bloomenthal, et al., "An Approach to Rapid Manufacturing with Custom Fixturing", Proceedings of the 2000 IEEE International Conference on Robotics & Automation, vol. 1, XP-010500221, Apr. 24, 2000, pp. 212-219.
"Fluid Connectors Product Directory", Parker Hannifin Corporation-Fluid Connectors Group, XP-002274303, Mar. 2003, 41 pages.

* cited by examiner

*Primary Examiner*—John C Hong
(74) *Attorney, Agent, or Firm*—Oblon, Spivak, McClelland, Maier & Neustadt, P.C.

(57) ABSTRACT

It is described how to easily manufacture a pipe fitting by machining instead of casting, despite its complex shapes and its small dimensions. A model is created, a machining program is defined, checks are made and the previous results are input into a numerically controlled machine tool.

19 Claims, 3 Drawing Sheets

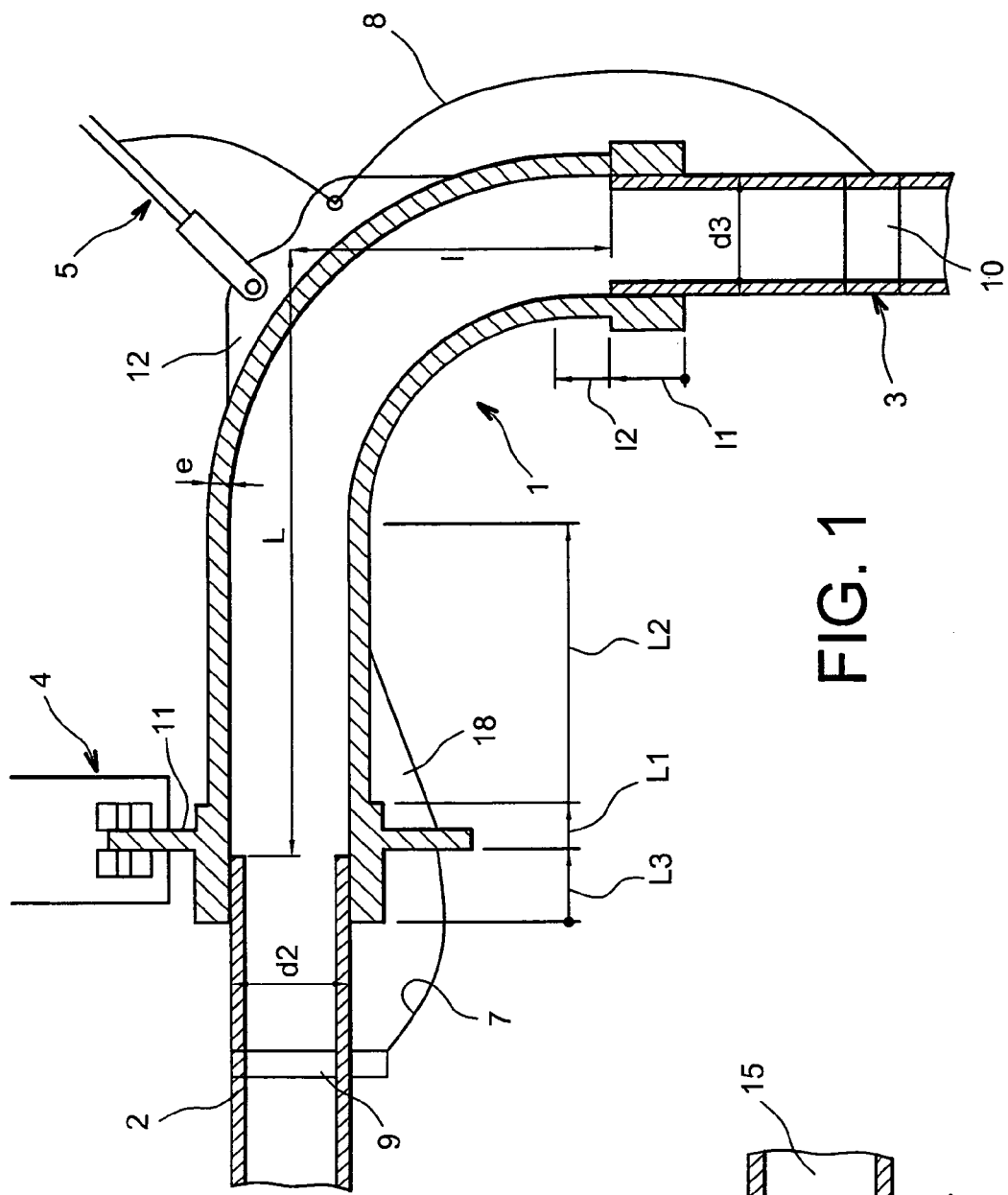
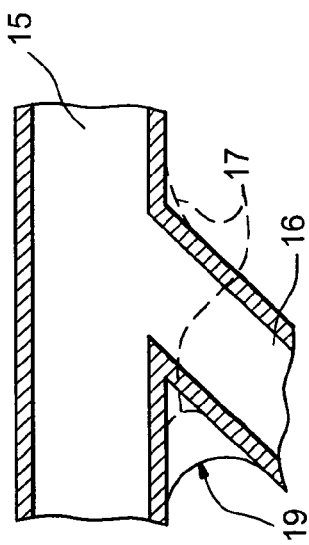
FIG. 1
FIG. 2

METHOD OF DESIGNING AND MANUFACTURING A PIPE FITTING, PARTICULARLY FOR AIRCRAFT

TECHNICAL DOMAIN

The purpose of this invention is above all a method of designing and manufacturing a pipe fitting, particularly for use in an aircraft. More particularly, it relates to a method of designing and manufacturing such a fitting involving high speed machining.

Pipe fittings in an aircraft are metallic parts used to connect two pipe lengths, for example straight rigid fuel pipes. In general, these fittings include one or several means of making attachments to the aircraft structure. They may be bends or T-shaped parts, etc., with a complex, non-uniform inside surface, or they may be fittings with a reverse taper.

These fittings may be cast in a known manner. This manufacturing method has several disadvantages. The minimum wall thickness is of the order of 2.3 to 2.6 mm for fittings made of aluminum, due to material mechanical characteristics and manufacturing tolerances. A significant weight reduction is difficult, although it is highly desirable in the aeronautical industry. After casting, the pipe fitting ends must be machined so that their surface condition is smooth enough so that they can be made sufficiently leaktight. This additional machining complicates the method. Each fitting has to be checked by a pressure test after manufacturing due to the risk of the development of bubbles or voids in the wall of this fitting during casting. An outside taper is necessary to remove fittings from their moulds, which is not good for flow since it increases head losses and turbulence.

Another important disadvantage is the need to make manufacturing molds, also including manufacturing operations that increase the price of the fitting. Finally, it is fairly frequent that a fitting has to be modified to adapt it to other connection conditions, but it is not easy to make such a change even if the change is modest, because the mold has to be remade.

The invention relates to a different method of designing and manufacturing pipe fittings. Its purpose is firstly to facilitate the task of designers working on the drawing of the fitting and its machining, and also to make a better fitting. The intermediate results obtained are used directly in subsequent steps in the method wherever possible, due to a judicious choice of design and manufacturing methods. Molding is no longer necessary. The fitting will generally be better and more quickly designed, due to the larger number of options available with the new manufacturing method and improved safety of the finished product due to better controlled design and manufacturing: the result is thus a lighter weight fitting.

More precisely, one purpose of the invention is to facilitate the manufacture of hollow fittings, with an outside surface and an inside surface, and the inside surface in particular possibly being complex shaped, for example a bend, a non-uniform and continuously changing section, that cannot be developed on a plane, or with a reverse taper and a thin wall (typically 1.5 mm instead of 2.3 mm to 2.6 mm according to known processes). One purpose of the invention that is subordinate to the above purpose is the definition of manufacturing rules for making this fitting, without applying forces that might break the thin wall, and avoiding manufacturing dimensional uncertainties that could have unacceptable consequences with a thin wall, while respecting the derived shape of the inside surface even if it is complex and difficult to access.

The method includes the following steps:
define functions and constraints (particularly dimensional) of the fitting;
prepare a drawing of the fitting, based on the said functions and constraints;
verify that it is possible to make the fitting, and revise the drawing if any defects are diagnosed during the verification;
define a machining program for the fitting, including selection of tools, tool trajectories and cutting parameters, using software and the drawing;
simulate the program and revise the program if any errors are diagnosed during the simulation; and
make the fitting by applying the machining program on a tight mass on a numerical controlled machine tool controlled by the machining program so as to machine an outside surface and an inside surface of the fitting, the inside surface being provided with a bend.

In one preferred embodiment of the method according to the invention, the said numerically controlled machine tool is a five-axis machine, particularly a machine tool free to move in three translations and two rotations relative to the machined part.

This and other aspects of the invention will be better understood, with reference to the following figures:

FIG. 1 is a fitting;

FIG. 2 is a fragment of another fitting;

Figure 5:
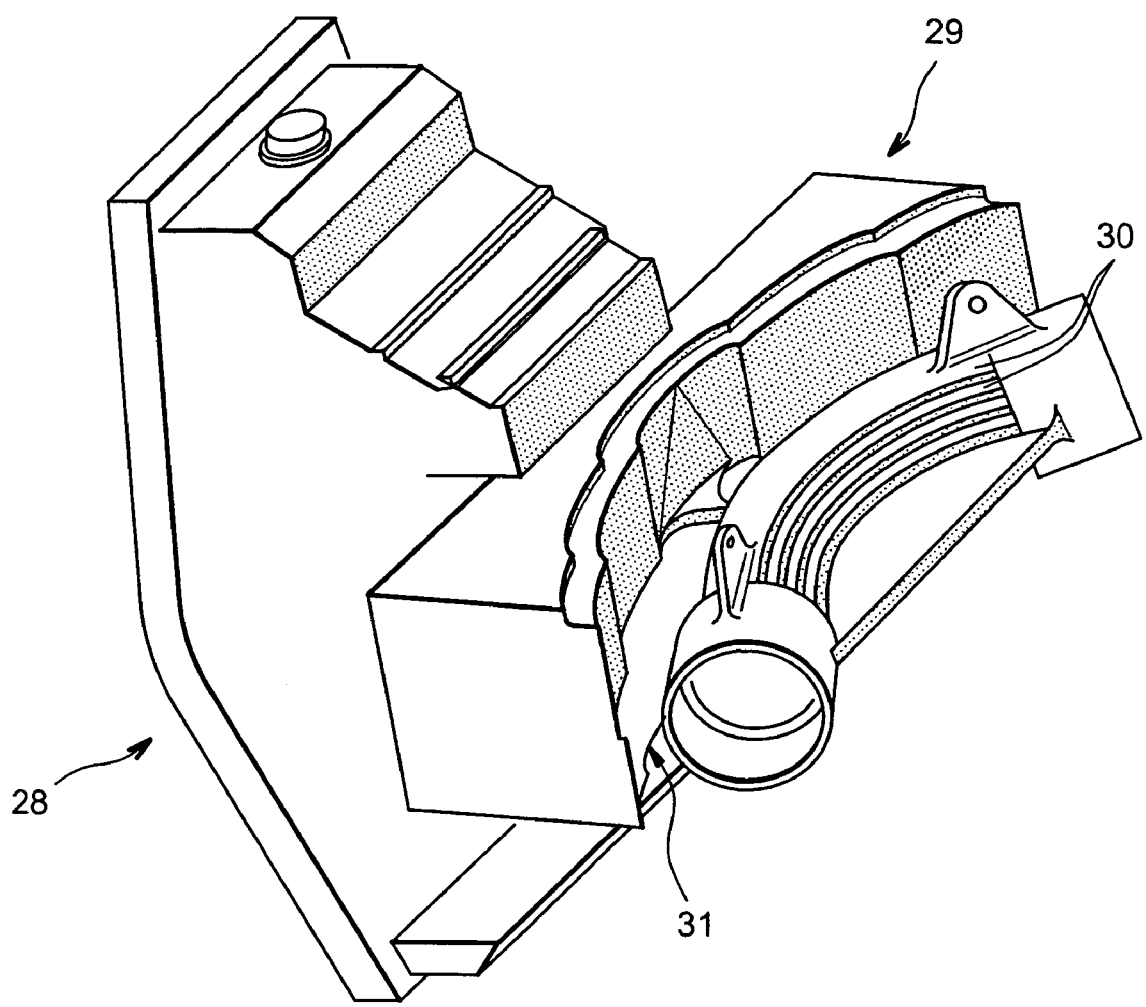

and FIG. 5 represents machining of the fitting.

The invention will now be described with reference to the figures, and firstly to FIG. 1 that shows a conventional type of pipe fitting to be made using the invention. It is marked as reference 1, and it connects two pipes 2 and 3 placed at a right angle from each other, at distances L and l. The design is made firstly by considering the design functions and constraints for the fitting. In particular, these functions and constraints are dimensional elements such as the positions and diameters of pipes to be connected, and positions and characteristics of junctions of the fitting to other locations in the surrounding structure: according to normal practice, the fitting 1 also supports tubes 2 and 3, in this case by a bracket 4 and a rod 5 for which the opposite ends, that are not shown, are fixed to the cockpit of the aircraft; finally, the electrical earthing braids 7 and 8 connect the collars 9 and 10 tightened around pipes 2 and 3 to the fitting 1, and to bracket 4 and to the rod 5 respectively. The pipes 2 and 3 are thus at the same potential as the cockpit of the aircraft. Therefore, the design of the fitting 1 must be extended by adding fasteners to the bracket 4 and the rod 5. The fluid pressure in the fitting is another constraint that has to be considered.

The operator creates a first version of the fitting 1. He determines the optimum positions of conduits connecting the pipes, the material thicknesses surrounding these conduits, the shapes and dimensions of the connecting parts to the surrounding structure, and the local characteristics of the fitting 1. He can use some simple calculation software to obtain radii of curvature of the conduit or thicknesses of the fitting depending on the fluid trajectory and pressure. The fitting then exists in the form of a model defined by its parameters that are input into a CAD CAM (computer aided design-computer aided manufacturing) software. In this case, the fitting 1 is in the general shape of a rounded bend, and it also comprises a flange 11 close to the pipe 2, in the shape of a circular collar, and a rib 12 at the outside of the bend. The flange 11 and the rib 12 are provided with drillings through which attachment screws can be inserted and earthing braids 7 and 8 can be fitted.

Typically, several tens of parameters are provided to completely define the limits of the fitting 1. In particular, for the pipe 2 the parameters include the lengths L1 of an extra thick end part of the fitting 1, L2 of a straight part of the fitting 1, L3 separating the flange 11 from the end of the fitting 1; and for the pipe 3, the lengths l1 of another thicker end of the fitting 1, and l2 of another straight part of the fitting 1; the inside diameters of the conduit of fitting 1, estimated using the outside diameters d2 and d3 of pipes 2 and 3; the thicknesses and overthicknesses of the fitting 1 in its various portions, such as e; the radius and the thickness of the flange 11, the contour of the thickness of the rib 12, and the positions of their drillings as a function of the position of the tubular part of the fitting 1 and the positions of the bracket 4 and the rod 5.

The segments of fitting 1 are also modeled by their directions, or the angles that they make. The bends may be modeled as being rounded with radii of curvature and extension angles, or as a series of straight segments with different lengths and directions.

The parameters file is advantageously easier to handle if the parameters are independent (as much as possible) to facilitate design changes made by the operator. The lengths L1 and L3 defining the position of the flange 11 on the straight portion may thus need to be modified if the bracket 4 is moved sideways in the final design of the aircraft, without needing to change the length L2. It is then recommended that all lengths L1, L2 and L3 should start from a common origin such as one end or one fixed point on the fitting 1 so that they are independent. In general, the length or the scale of the fitting 1 is likely to be changed before manufacture.

The CAD CAM software may then express the model of the fitting 1 by a set of points if required, for example for a finite elements model.

The user then checks the fitting 1. This check is inherently empirical, and consists of making sure that the design has not introduced anything that cannot be manufactured. The user modifies parameters associated with defective regions of the fitting. One example for a typical situation, applies to a junction fitting 7 like that shown in FIG. 2: it is necessary to check that the junction between the main tube 15 and the junction 16 is made with radii of curvature greater than a certain value. The step would then consist of adding a fillet to eliminate the sharp angle and replace it with rounded fillets shown as dashed lines 17.

A different type of check that can be made is for mechanical strength. The model of the fitting is divided into finite elements and analyzed, under the forces that it is assumed will be applied to it. Thicknesses can be increased or ribs like the rib 18 in FIG. 1 can be added between the flange 11 and the tubular part of the fitting 1, if zones with excessive stresses are found. This type of rib can often be used between portions of the fitting forming an angle, such as portions of a junction; a rib 19 could thus possibly be added between portions 15 and 16 of the fitting in FIG. 2. For this check, the calculation will be made automatically using a finite elements model of the fitting, and the operator could then modify the structure by adjusting existing parameters (thickness, etc.) or by adding new structural elements defined by new parameters.

These check steps are usually iterative, since each new model has to be checked until a completely satisfactory model is obtained. There may be a relatively large number of checks if it is required to reduce the weight of the fitting by reducing thicknesses, which is very desirable, but may be contrary to previous checks which may demonstrate that material has to be added.

Figure 3:
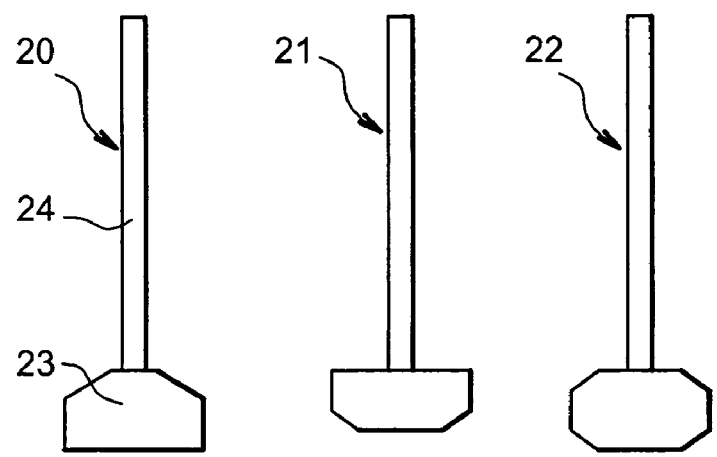
FIG. 3 illustrates a few tools.

The next step is to define a machining program. Since the entire fitting 1 has to be machined, machining conditions have to be defined for the outside surface and for the inside surface. The tools used most frequently will be tangential machining cutters, due to the predominance of curved surfaces. Preferably, the tool will be chosen to enable high speed machining on a numerically controlled machine in order to reduce machining time and the manufacturing cost while providing a better surface quality due to lower vibrations. It will be preferred to do all machining with few tools; however, for example, if it is found that a single tool cannot be used for all machining on the fitting 1 in the next step, one or several other tools will be added into the machining program. The tools will be defined in a library that will indicate their characteristics, particularly dimensional. Other tools can be added if there is no suitable tool existing in the library. Different types of tools 20, 21 and 22 shown in FIG. 3 can be used for machining of tapers, reverse tapers or both using cutting parts 23 chamfered on the side of the shank 24, on the opposite side or on both sides.

The software knows is provided with the geometric definitions of the envisaged fitting 1 and of the tools, and uses them to determine a series of machining paths necessary to machine the entire fitting 1 using the chosen tools.

Figure 4:
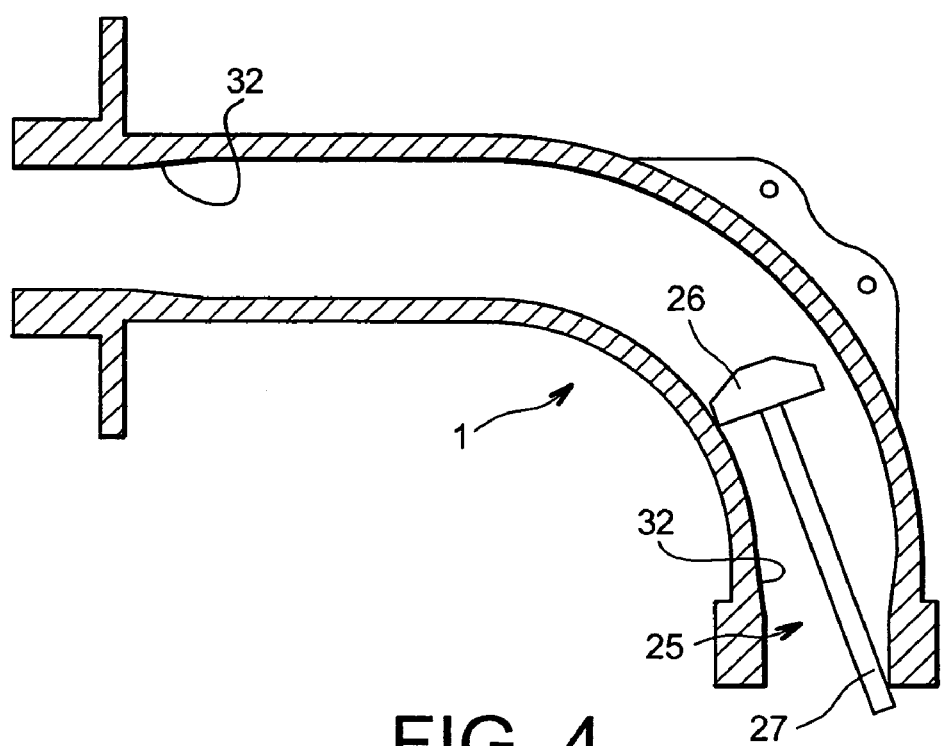
FIG. 4 illustrates a verification.

The next step is to check the machining program, that is digitally simulated using the dimensions of the chosen tools. The type of checks carried out is as shown in figure 4; the tool 25 is introduced into the blank of the fitting I and the lateral surface of its machining head 26 is active and cuts the inside surface of the tubular part close to the bend. The software then determines whether or not it is possible to place the tool 25 so as to prevent a collision between the shank 27 and the solid parts of the fitting. If a collision is detected, the software searches for a suitable position of the tool 25 so that machining can be continued, otherwise another tool is suggested as a replacement. Machining of the inside surface of the fitting is more often critical, but the check is applicable to all surfaces.

When a set of paths has been found that is satisfactory for the entire surface of the fitting 1, the software stores it with the model of the fitting. Apart from these finishing paths, the machining program actually includes rough cutting paths for which the usefulness is described below.

The choice of high speed machining (HSM) makes it possible to use tools 25 with a long shank 27 since lateral cutting forces are lower, and thus to more easily access areas on the inside surface well inside the fitting, even if this surface is complicated, for example by a reverse taper 32, in other words a tapered portion of the inside surface or widening of the conduit that might be selected to improve the resistance of the fitting 1 at the junctions of pipes 2 and 3.

We will now describe the machining method, with reference to FIG. 5. The machine tool used is numerically controlled and comprises a pair of jaws 28 between which the blank of the fitting to be machined is gripped. It is firstly a block 29, from which the fitting will be shaped. The figure shows an intermediate stage of the machining, in which the shape of the fitting 1 is recognizable and partly separated from the remaining part of the block 29. It is recommended that the work should be done stepwise during the rough cutting phase, in other words the block 29 should be machined by successive parallel passes so as to form steps 30 from which the outside surface of the fitting 1 is rough cut. The tool is guided as a function of the file of points in the model of the fitting 1 obtained during the previous steps and as a function of the paths file. When a sufficient quantity of material has been removed by this means, a finishing or partly finishing machining of the tube is started on lines parallel to and intermediate to the previous lines to make the stepped surface more uniform and converge towards the required outside surface. A finishing machining may be added later to make the surface satisfactorily smooth. The inside of the tube is also machined in successive passes, that usually include tangential cutting. These machining operations by tangential cutting are also used for finishing curved parts of the fitting, both inside and outside, as shown in the diagram in FIG. 4. The connection areas at pipes 2 and 3 are recut if necessary using special tools to achieve the required smooth surface. Finally, the connection strip 31 left between the blank of the fitting and the remaining part of the block 29 is cut out to separate the fitting from a heel remaining fixed to the machine. Final machining of this strip may be done differently, for example using a saw external to the numerically controlled machine tool.

One important aspect is that the fitting 1 is completely machined without any intermediate disassembly that could introduce dimensional uncertainties. Therefore, it can be done with a thinner wall without introducing a risk of breakage under fluid pressure. A single unit in a production series must be checked to make sure that it resists the fluid pressure, bearing in mind that the supplier has checked the material from which the fittings in this series are machined to make sure that there are no voids, bubbles, etc., before the machining is started. Conduits with a shape better adapted to the flow, and particularly with a constant and perfectly rounded section, can be drilled. Thinner walls, with a thickness of about 1.5 mm instead of 2.3 to 2.6 mm required for casting, are possible and weights can be reduced by about 30%.

Another important aspect of the invention is the preferred choice of a high speed machining (HSM) method that reduces vibrations, improves machining quality and lateral cutting forces, so that longer tools can be used capable of providing better access to places otherwise difficult to access or reverse tapered parts on the inside surface. This is particularly valuable for surfaces inside bends, where this type of access difficulty always arises.

The invention claimed is:

1. A method of manufacturing a pipe fitting comprising tubular parts, including the following steps:
   defining functions and constrains including constraints of the pipe fitting;
   preparing a model of the pipe fitting, based on said functions and constraints;
   checking that making the pipe fitting is possible, and revising the model if any defects are diagnosed during said checking;
   defining a machining program for the pipe fitting, including selection of tools, tool trajectories and cutting parameters, using a software and the model;
   simulating machining the pipe fitting and revising the machining program if any errors are diagnosed during the simulating, and
   machining the pipe fitting by applying the machining program on a clamped block on a numerically controlled machine tool controlled by the machining program so as to machine an outside surface and an inside surface of the pipe fitting, the inside surface including a bend,
   wherein the checking step includes checking mechanical strength of the pipe fitting by an automatic computation based on parameters of the model.

2. The method according to claim 1, wherein the checking step comprises iterative adjustments of the model each followed by one of said checking of mechanical strength.

3. The method according to claim 2, wherein the iterative adjustments comprise adjustments of a thickness of a wall of the pipe fitting.

4. The method according to claim 2, wherein the iterative adjustment comprise additions of reinforcing ribs.

5. The method of manufacturing a pipe fitting according to claim 1, further comprising working on tube blanks by successive passes in steps, internal machining of the tubes by tangential cutting, finishing with adjustments of radii of curvature of the inside surface by tangential cutting, and a final cutting of the pipe fitting by separation of said pine fitting from a heel of the block remaining fixed to the machine tool.

6. The method of manufacturing a pipe fitting according to claim 1, wherein the simulating step includes checking collisions between tools and tool shanks with the pipe fitting.

7. The method of manufacturing a pipe fitting according to claim 1, wherein an outside and an inside surface of the pipe fitting are machined without intermediate disassembly of a machine tool fitting.

8. The method of manufacturing a pipe fitting according to claim 1, wherein said machine tool is configured to perform a High Speed Machining (HSM).

9. The method of manufacturing a pipe fitting according to claim 1, wherein said machining is performed on all surfaces of the pipe fitting.

10. The method of manufacturing a pipe fitting according to claim 9, further comprising a step of machining a reverse taper on an inside surface of the pipe fitting.

11. The method of manufacturing a pipe fitting according to claim 9, further comprising a step of mounting said pipe fitting in an aircraft.

12. A method of manufacturing a pipe fitting comprising tubular parts, including the following steps:
    defining functions and constrains including dimensional constraints of the pipe fitting;
    preparing a model of the pipe fitting, based on said functions and constraints;
    checking that making the pipe fitting is possible, and revising the model if any defects are diagnosed during said checking;
    defining a machining program for the pipe fitting including selection of tools tool trajectories and cutting parameters, using a software, a library of tools containing characteristics of tools including dimensional characteristics, and the model;
    using said software for simulating the machining program and revising the machining program if any errors are diagnosed, the simulating step including a checking of collisions between tools and tool shanks with the pipe fitting, and
    machining the pipe fitting by applying the machining program on a clamped block on a numerically controlled machine tool controlled by the machining program so as to machine an outside surface and an inside surface of the fitting, the inside surface including a bend.

13. The method of manufacturing a pipe fitting according to claim 12, including working on tube blanks by successive passes in steps, internal machining of the tubes by tangential cutting, finishing with adjustments of radii of curvature of the inside surface by tangential cutting, and a final cutting of the fitting by separate of the said fitting from a heel of the block remaining fixed to the machine tool.

14. The method of manufacturing a pipe fitting according to claim 12, wherein the checking includes checking mechanical strength of the pipe fitting.

15. The method of manufacturing a pipe fitting according to claim 12, wherein an outside and an inside surface of the pipe fitting are machined without intermediate disassembly of a machine tool fitting.

16. The method of manufacturing a pipe fitting according to claim 12, wherein said machine tool is configured to perform a High Speed machining (HSM).

17. The method of manufacturing a pipe fitting according to claim 12, wherein said machining is performed on all surfaces of the pipe fitting.

18. The method of manufacturing a pipe fitting according to claim 17, further comprising a step of machining a reverse taper on an inside surface of the pipe fitting.

19. The method of manufacturing a pipe fitting according to claim 17, further comprising a step of mounting said pipe fitting in an aircraft.

* * * * *